(12) United States Patent
Terada et al.

(10) Patent No.: US 7,926,865 B2
(45) Date of Patent: Apr. 19, 2011

(54) VEHICLE STRUCTURE FOR AUTOMOBILE

(75) Inventors: Sakayu Terada, Hiroshima (JP); Miho Kowaki, Hiroshima (JP); Nobuyuki Nakayama, Aki-gun (JP)

(73) Assignee: Mazda Motor Corporation (JP)

( * ) Notice: Subject to any disclaimer, the term of this patent is extended or adjusted under 35 U.S.C. 154(b) by 215 days.

(21) Appl. No.: 12/210,282

(22) Filed: Sep. 15, 2008

(65) Prior Publication Data

US 2009/0085362 A1 Apr. 2, 2009

(30) Foreign Application Priority Data

Oct. 1, 2007 (JP) ................................. 2007-257097

(51) Int. Cl.
*B60R 19/26* (2006.01)
(52) U.S. Cl. ....................................................... 296/132
(58) Field of Classification Search ............. 296/187.09, 296/68.1, 187.03; 293/132, 120, 102, 133, 293/155; 404/6; 280/375; 297/216.1
See application file for complete search history.

(56) References Cited

U.S. PATENT DOCUMENTS

| | | | |
|---|---|---|---|
| 6,474,709 B2 * | 11/2002 | Artner | 293/133 |
| 6,648,385 B2 * | 11/2003 | Frank | 293/133 |
| 6,672,438 B2 * | 1/2004 | Beck | 188/377 |
| 6,863,321 B2 * | 3/2005 | Jonsson et al. | 293/102 |
| 6,893,063 B2 * | 5/2005 | Harrison et al. | 293/117 |
| 7,213,867 B2 * | 5/2007 | Haneda et al. | 296/132 |
| 7,357,432 B2 * | 4/2008 | Roll et al. | 293/133 |
| 7,407,206 B2 * | 8/2008 | Arns et al. | 293/133 |
| 7,413,226 B2 * | 8/2008 | Muskos | 293/133 |
| 7,533,913 B2 * | 5/2009 | Bae | 293/133 |
| 7,543,537 B2 * | 6/2009 | Seitzberger et al. | 105/392.5 |
| 7,631,924 B2 * | 12/2009 | Nilsson | 296/133 |
| 2003/0218341 A1 * | 11/2003 | Jonsson et al. | 293/102 |
| 2006/0202493 A1 | 9/2006 | Tamura et al. | |
| 2008/0098601 A1 * | 5/2008 | Heinz et al. | 29/897.2 |
| 2009/0001737 A1 * | 1/2009 | Salomonsson | 293/133 |
| 2009/0115208 A1 * | 5/2009 | Kano et al. | 293/132 |
| 2009/0261602 A1 * | 10/2009 | Karlander | 293/132 |
| 2010/0148526 A1 * | 6/2010 | Karlander | 293/155 |
| 2010/0164238 A1 * | 7/2010 | Nakanishi et al. | 293/132 |

FOREIGN PATENT DOCUMENTS

| | | |
|---|---|---|
| EP | 0 856 681 A1 | 8/1998 |
| JP | 08 276804 A | 10/1996 |
| JP | 09 020190 A | 1/1997 |
| JP | 2005 271858 A | 10/2005 |
| WO | 2005010398 A1 | 3/2005 |

OTHER PUBLICATIONS

Extended European Search Report dated Oct. 5, 2009; Application No./Patent No. 08017301.6-1264 / 20045142.

* cited by examiner

*Primary Examiner* — Kiran B. Patel
(74) *Attorney, Agent, or Firm* — Studebaker & Brackett PC; Donald R. Studebaker (57) ABSTRACT

A vehicle structure for an automobile includes: a bumper beam extending in a car width direction; a crash box extending in a longitudinal direction of the automobile and connected at a distal end thereof to a side part in the car width direction of the bumper beam; and a mounting plate having a face to which a base end of the crash box is connected and another face mounted to a distal end of a vehicle frame extending in the longitudinal direction of the automobile by means of fasteners. The crash box is in a substantially cross shape in closed section.

11 Claims, 11 Drawing Sheets

First deformation pattern

Second deformation pattern

← Vehicle front

VEHICLE STRUCTURE FOR AUTOMOBILE

CROSS REFERENCE TO RELATED APPLICATIONS

This non-provisional application claims priority under 35 U.S.C. §119(a) on Patent Application No. 2007-257097 filed in Japan on Oct. 1, 2007, the entire contents of which are hereby incorporated by reference.

BACKGROUND OF THE INVENTION

1. Field of the Invention

The present invention relates to vehicle structures for automobiles and particularly relates to a vehicle structure for an automobile in which crash boxes are provided at distal ends of vehicle frames extending in the longitudinal direction of the automobile.

2. Description of Related Art

A vehicle structure for an automobile has been known conventionally in which crash boxes having a rigidity lower than that of vehicle frames (front side frames or rear side frames) in the axial direction thereof (the longitudinal direction of the vehicle) are provided at the distal ends of the vehicle frames to cause buckling and deformation of the crash boxes for appropriately absorbing the impact energy at the initial stage of collision of the automobile.

For example, WO2005/010398 discloses a crash box of which original shape is in a substantially flat octagonal shape in section as an impact absorbing member. In the crash box, an inwardly recessed trench is formed in a long side thereof to increase ridges of the crash box for causing stable buckling in the axial direction thereof with no increase in weight involved, thereby ensuring a predetermined amount of impact absorption.

Formation of the trench in the crash box in a flat polygonal shape in section results in that the direction that the trench is deformed and the direction that the other part is deformed upon receipt of an impact load are reverse to each other to be cancelled, so that the crush boxes can be buckled and deformed appropriately in the axial direction thereof.

SUMMARY OF THE INVENTION

Problems That the Invention is to Solve

A front side frame of a vehicle is usually formed in a vertically oblong rectangular shape in section. Accordingly, the crash box disclosed in WO2005/010398 is mounted to the distal end of the front side fame so that the long side in section thereof is set in the vertical direction to transmit a load to the front side frame definitely.

Actually, this mounting of the crash box leads to definite buckling and deformation of the crash box upon receipt of a load from the front, thereby allowing the crash box to absorb the impact energy.

Upon receipt of an offset load in the direction offset in the car width direction, however, the crash box falls and is deformed readily because formation of the trench recessed in the side face of the crash box lowers the section modulus and the transverse rigidity.

When the crash box falls and is deformed, it may exhibit insufficient impact energy absorbing performance, which means that the crash box may not exert its original function.

Whether buckling deformation or falling deformation is caused depends on the input angle of an impact load. Stable exhibition of the impact energy absorbing performance by the crash box depends on whether buckling deformation or falling deformation is caused. Unstable exhibition thereof leads to unstable transmission of the impact energy to the vehicle frame. This invites difficulty in vehicle design.

In view of the foregoing, the present invention has its object of providing a vehicle structure for an automobile including a crash box at a distal end of a vehicle frame extending in the longitudinal direction of the automobile which can definitely exhibit impact energy absorbing performance not only upon receipt of a load from the front but also upon receipt of a load offset in the car width direction by definitely buckling and deforming the crash box.

Means for Solving the Problems

A vehicle structure for an automobile in accordance with the present invention includes: a bumper beam extending in a car width direction; a crash box extending in a longitudinal direction of the automobile and connected at a distal end thereof to a side part in the car width direction of the bumper beam; and a mounting plate having a face to which a base end of the crash box is connected and another face mounted to a distal end of a vehicle frame extending in the longitudinal direction of the automobile by means of fasteners, wherein the crash box is in a substantially cross shape in closed section.

In the above arrangement, the crash box has the substantially cross shape in closed section, so that the section modulus in the vertical direction and in the transverse direction of the automobile increase to increase the rigidity in the transverse direction.

Since the rigidity of the crash box in both the vertical direction and the transverse direction can be increased, the crash box can be prevented from falling deformation even upon receipt of, for example, a load offset in the car width direction.

In one aspect of the present invention, joint holes through which the fasteners are inserted are formed at four corners of the mounting plate, and protrusions of the crash box in the substantially cross shape in closed section are arranged between the joint holes.

According to the above arrangement, the protrusions of the crash box are located in the vicinity of the fasteners. This ensures that an impact load transmitted from the crash box to the mounting plate is definitely transmitted to the fasteners.

Hence, the crash boxes can receive the impact energy effectively to enhance the impact energy absorbing performance of the crash boxes.

In one aspect of the present invention, the substantially cross shape in closed section of the crash box has sides of which lengths are almost equal to each other.

In the above arrangement, the lengths of the sides are set almost equal to each other to equalize the "collapse pitch," which varies depending on the lengths of the sides, in the entire periphery of the closed section, so that the deformation modes that the crash box is buckled and deformed can be caused stably.

Hence, the deformation modes can be caused constantly regardless of the input angle of an impact load, thereby achieving stable impact energy absorbing performance of the crash box.

In one aspect of the present invention, the vehicle frame is in a vertically oblong rectangular shape, and four protrusions of the crash box in the substantially cross shape in closed section extend in a vertical direction and a transverse direction of the automobile so that: an upper end wall of an upper protrusion of the four protrusion of the crash box agrees with an upper wall of the vehicle frame when viewed from front while a lower end wall of a lower protrusion of the four protrusions thereof agrees with a lower wall of the vehicle frame when viewed from the front.

In the above arrangement, the upper end wall of the upper protrusion of the crash box in the substantially cross shape in closed section substantially agrees with the upper wall of the vehicle frame when viewed from the front while the lower end wall of the lower protrusion thereof agrees with the lower wall of the vehicle frame when viewed from the front. Accordingly, the crash box is overlapped at both the upper and lower protrusions and the right and left protrusions thereof with the vehicle frame in the vertically oblong rectangular shape in section.

This ensures that the base end part of the crash box is supported by the vehicle frame upon receipt of an impact load to cause the crash box to be buckled and deformed definitely, thereby allowing the crash box to absorb the impact energy.

Hence, the crash box even in the substantially cross shape in closed section can absorb the impact energy definitely at the distal end of the vehicle frame in the vertically oblong rectangular shape in section.

In one aspect of the present invention, the vehicle frame is in a vertically oblong rectangular shape, and four protrusions of the crash box in the substantially cross shape in closed section are inclined with respect to the vertical direction of the automobile so that the side walls of the protrusions are intersected at central parts in the vertical direction of the crash box with side walls of the vehicle frame when viewed from front.

In the above arrangement, the four protrusions of the crash box in the substantially cross shape in closed section extend diagonally. This allows the cross shape in closed section of the crash box to form a substantially X shape in closed section so that the side walls in the central part in the vertical direction of the crash box and the side walls of the vehicle frame in the vertically oblong rectangular shape in section are intersected with each other when viewed from the front.

With the arrangement, the base end part of the crash box is supported definitely by the vehicle frame upon receipt of an impact load to cause the crash box to be buckled and deformed definitely, thereby allowing the crash box to absorb the impact energy.

Hence, the crash box even in the X shape in closed section can absorb the impact energy definitely at the distal end of the vehicle frame in the vertically oblong rectangular shape in section.

In one aspect of the present invention, at least one of the protrusions of the crash box in the substantially cross shape in closed section has a width which is wider at a base part thereof than at a distal part thereof.

In the above arrangement, the width in section of each protrusion is wider at the base part than at the distal part. This secures the wide space around the outer periphery of the crash box while increasing the closed sectional area inside thereof.

Hence, the work space for an operation tool for the fasteners even arranged between the protrusions are reserved sufficiently to facilitate the fastening operation. Further, the sectional area of the crash box is increased to increase the section modulus, thereby increasing the rigidity of the crash boxes in the direction where they fall.

In one aspect of the present invention, the crash box is formed by overlaying a plurality of members and spot-welding wall faces thereof overlapped with each other, the wall faces being peripheral walls of protrusions of the substantially cross shape in closed section.

In the above arrangement, the overlapped wall face as a welded part is set at the peripheral wall of given protrusions of the substantially cross shape in closed section. Accordingly, a spot gun or the like can be inserted easily into the longest internal space between opposed two of the protrusions in the substantially cross shape in closed section. This effective space utilization facilitates spot welding.

Thus, the workability for welding the crash box can be increased by effectively utilizing the internal space of the substantially cross shape in closed section of the crash box.

In one aspect of the present invention, a reinforcing member extending in the transverse direction of the automobile is provided to the vehicle frame so as to agree with one of protrusions of the crash box which extends in the transverse direction thereof when viewed from the front.

In the above arrangement, the reinforcing member extending in the transverse direction is provided at the vehicle frame in the vertically oblong rectangular shape so that the vehicle frame and the reinforcing member form a substantially cross shape which substantially agrees with the substantially cross shape in closed section of the crash box.

This allows the entire base end part of the crash box to be supported upon receipt of an impact load to cause buckling and deformation of the entire periphery of the crash box, thereby allowing the crash box to absorb the impact energy.

Thus, the impact energy can be absorbed uniformly at the entire periphery of the crash box.

In one aspect of the present invention, the reinforcing member includes: a frame mounting face mounted to a side face of the vehicle frame; a plate mounting face mounted to the other side face of the mounting plate; and a beam part extending in the longitudinal direction of the automobile between the frame mounting face and the plate mounting frame, the beam being narrow in the car width direction as it goes away from the distal end of the vehicle frame.

In the above arrangement, the beam extending in the longitudinal direction of the automobile bridges between the frame mounting face and the plate mounting face to exhibit the bracing force upon receipt of an impact load, thereby further increasing the supporting rigidity of the reinforcing member for the crash box.

Further, the beam is narrow as it goes away from the distal end of the vehicle frame, and accordingly, does not hinder arranging, for example, an on-vehicle member aside the vehicle frame.

Hence, the supporting rigidity of the reinforcing member for the crash box can be increased while the layout space aside the vehicle frame can be secured.

EFFECTS OF THE INVENTION

According to the present invention, the rigidity of the crash box can be increased both in the vertical direction and in the transverse direction to prevent falling deformation of the crash box even upon receipt of, for example, a load offset in the car width direction.

Hence, in the vehicle structure for an automobile in which the crash box is provided at the distal end of the vehicle frame extending in the longitudinal direction of the automobile, the crash box can be buckled and deformed definitely not only upon receipt of a load from the front but also upon receipt of a load offset in the car width direction to exhibit the impact energy absorbing performance definitely.

BRIEF DESCRIPTION OF THE DRAWINGS

FIG. 7 shows difference in deformation state of the crash box where a load input direction is different, wherein

FIG. 9 shows deformation states of the front end part in the vehicle structure upon offset collision, wherein

BEST MODE FOR CARRYING OUT THE INVENTION

Embodiments of the present invention will be described below with reference to the accompanying drawings.

Embodiment 1

Figure 1:
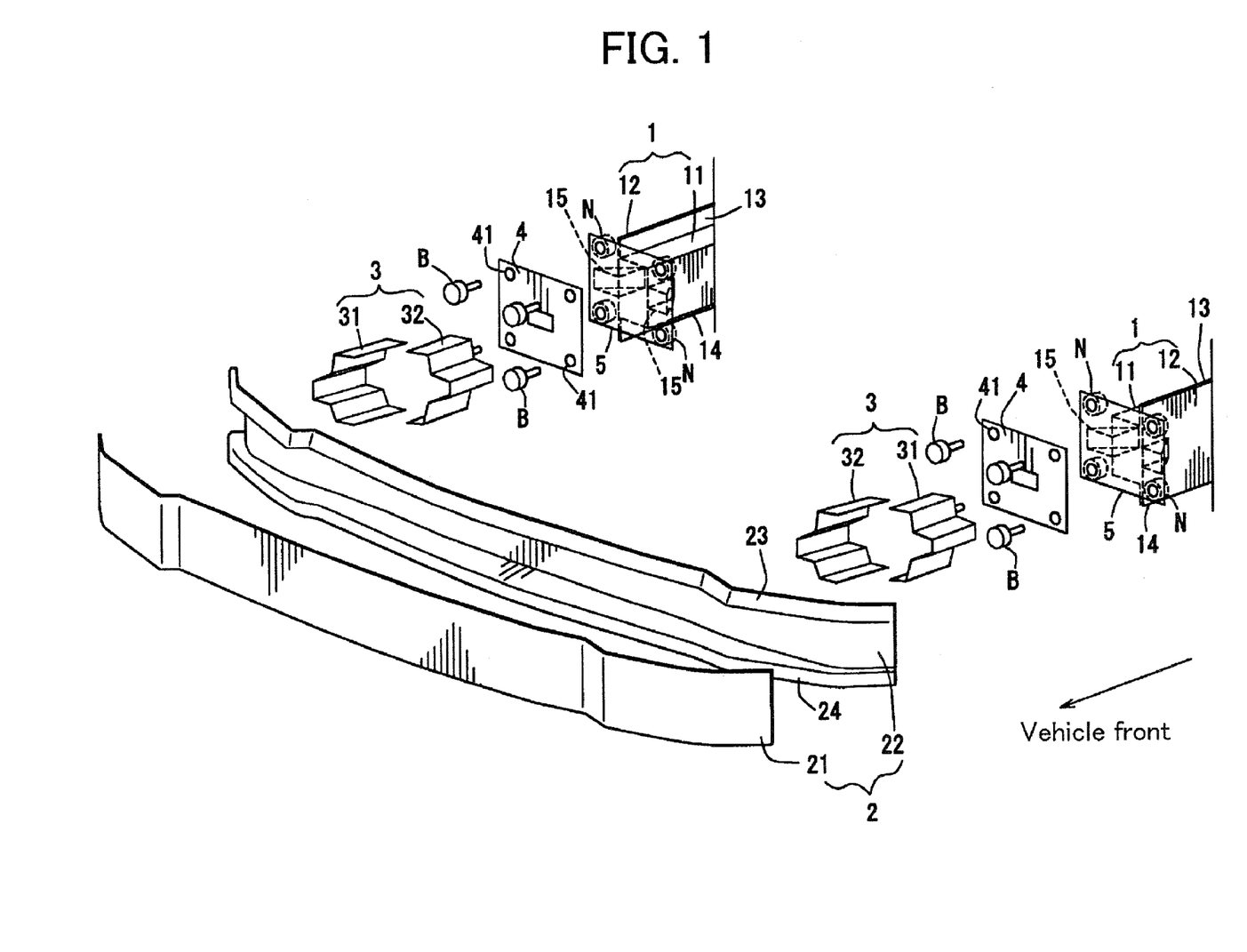
FIG. 1 is an exploded perspective view showing a front end part in a vehicle structure employing Embodiment 1.
Figure 2:
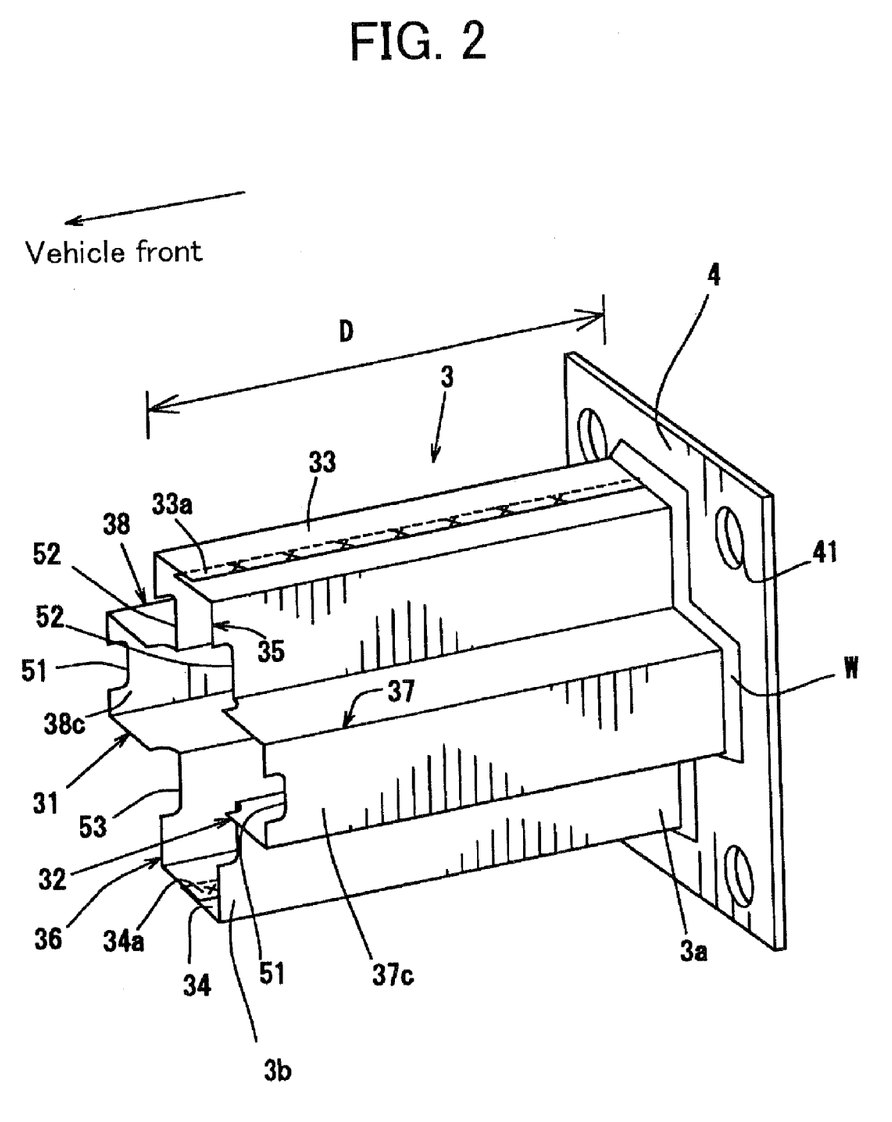
FIG. 2 is an overall perspective view of a crash box in Embodiment 1.
Figure 3:
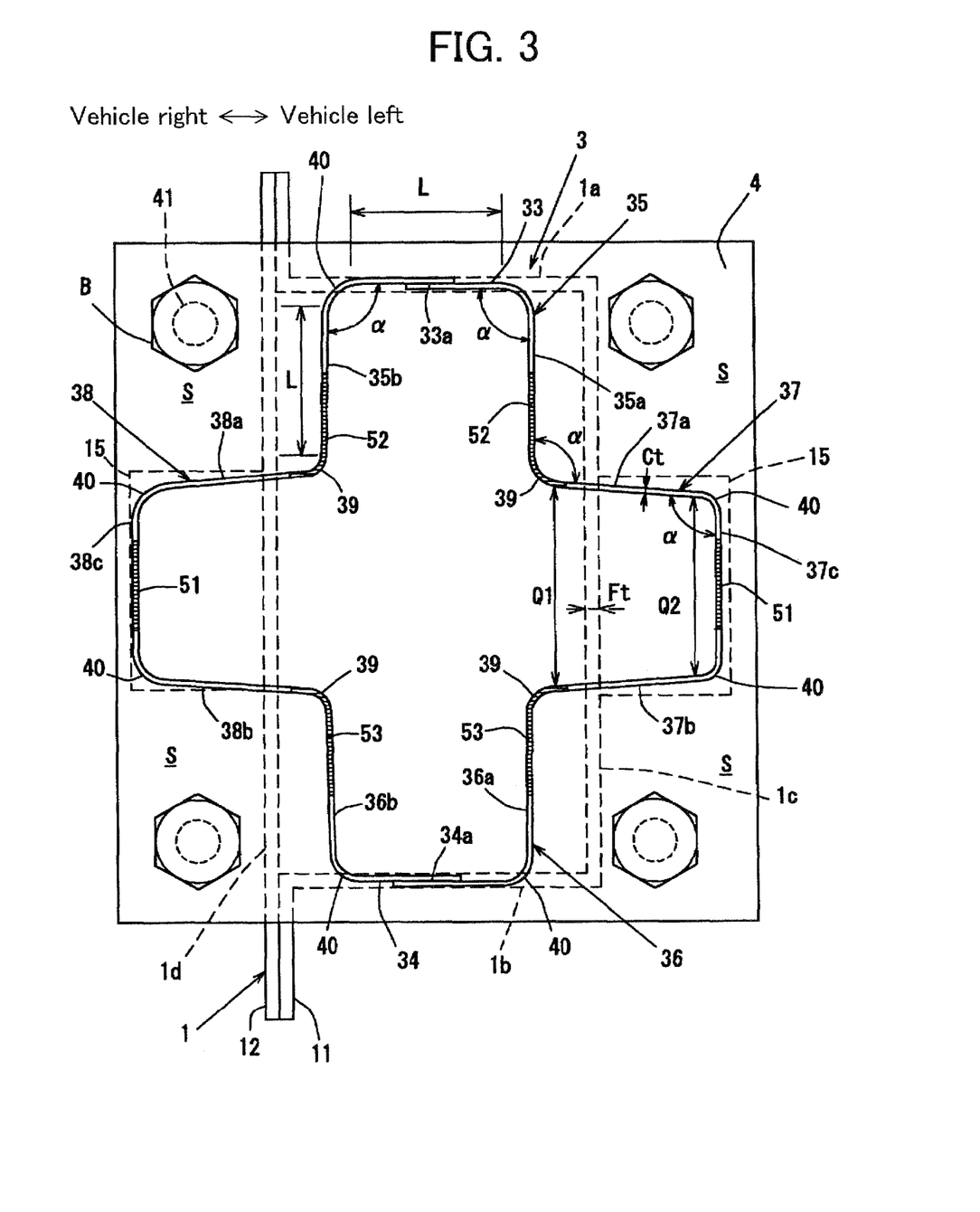
FIG. 3 is a detailed front view showing the positional relationship between the crash box and a front side frame on the right side of a vehicle.
Figure 4:
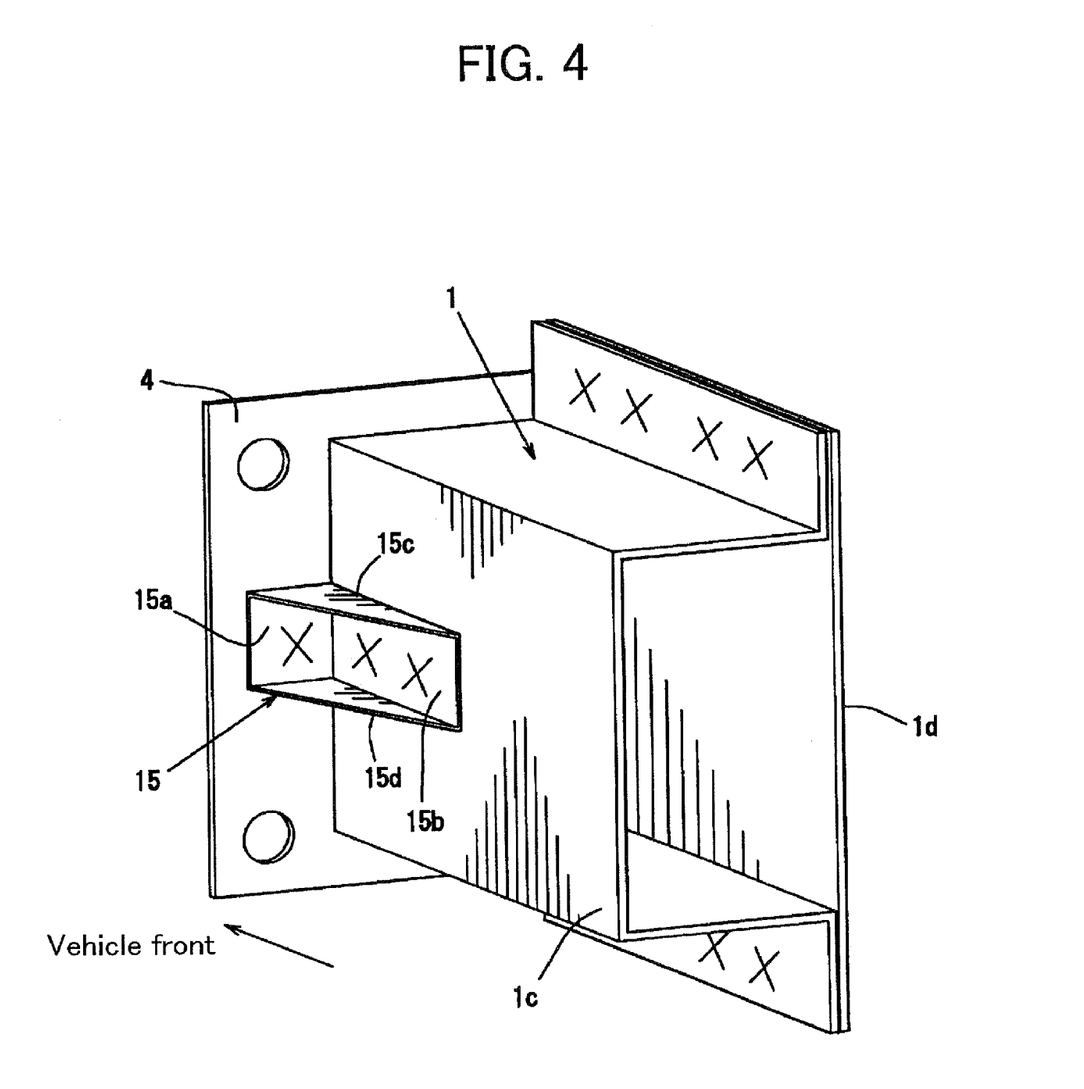
FIG. 4 is a perspective view showing a reinforcing bracket provided at the front side frame.

A vehicle structure for an automobile in accordance with Embodiment 1 will be described first with reference to FIG. 1 to FIG. 4. FIG. 1 is a perspective view of a front end part in the vehicle structure employing the present invention, FIG. 2 is an overall perspective view of a crash box in accordance with the present embodiment, FIG. 3 is a detailed front view showing the positional relationship between the crash box and a front side frame on the right side of a vehicle, and FIG. 4 is a perspective view of a reinforcing bracket provided at the front side frame.

As shown in FIG. 1, the vehicle structure at the front end part of a vehicle includes: pair of right and left front side frames 1, 1 extending in the longitudinal direction of the vehicle; a bumper beam 2 extending in the car width direction on the vehicle front side of the front side frames 1,1; a pair of right and left crash boxes 3, 3 extending rearward of the vehicle from the side ends in the car width direction of the bumper beam 2; and set plates 4, 4 fastening and fixing the crash boxes 3, 3 to the front side frames 1, 1.

The front side frames 1, 1 are arranged right and left so as to be spaced in the car width direction and each include an inboard member 11 in a hat-like shape in section arranged inboard and an outboard member 12 in a plate shape arranged outboard. The inboard member 11 and the outboard member 12 are joined to each other through upper and lower joint flanges 13, 14 of the inner member 12 to form a vertically oblong rectangular shape in closed section.

At the front end part of each front side frame 1, two reinforcing brackets 15 are provided.

The bumper beam 2 extends in the car width direction to connect the right and left front side frames 1, 1 and includes a beam plate 21 in a band-like shape extending in the car width direction and a beam member 22 in a hat-like shape in section extending in the car width direction. The beam plate 21 and the beam member 22 are jointed to each other through upper and lower joint flanges 23, 24 of the beam member 22 to form a closed section extending in the car width direction.

The crash boxes 3, 3 are provided correspondingly to the front side frames 1, 1 and are each formed in such a fashion that metal-made bent members 31, 32 in a substantially gate shape in section of which the central parts are protruded are combined with and joined to each other. The crash boxes 3, 3 will be described later in detail.

Each set plates 4 is formed of a metal-made plate member in a substantially square shape, at each corner of which a joint hole 41 is formed. A bolt B and a nut N are engaged with each other through each joint hole 41 for fastening and fixing the corresponding set plate 4 to the front end of the corresponding front side frame 1. The base end parts (the rear end parts) 3a, 3a of the crash boxes 3, 3 are bonded and fixed to the front faces of the set plates 4, 4.

Fixing plates 5, 5 in a substantially square shape are bonded to the front ends of the front side frames 1, 1 so as to correspond to the set plates 4, 4. The set plates 4, 4 are fastened and fixed to the fixing plates 5, 5 by means of the bolts B and the nuts N to thus fasten and fix the crash boxes 3, 3 to the front ends of the front side frames 1, 1.

Each of the crash boxes 3, 3 is formed, as shown in FIG. 2, in such fashion that the two bent members 31, 32 are combined with each other from right and left and an overlap part 33a of an upper end wall 33 and an overlap part 34a of a lower end wall 34 are spot-welded vertically.

Accordingly, each crash box 3 has a substantially cross shape (a substantially boxed cross shape, see FIG. 3) in closed section. Specifically, each crash box 3 is set as follows.

This cross shape in closed section is so formed that substantially rectangular protrusions 35, 36, 37, 38 are formed to protrude upward, downward, rightward, and leftward. The lengths L of the sides of the protrusions 35, 36, 37, 38 are set almost equal to each other. Each angle α that the corners 39, 40 form is set substantially at a right angle (90 degrees).

Ridges 39, 40, namely, the corners between the sides of the protrusions 35, 36, 37, 38 are four inwardly folded ridges 39 and eight outwardly folded ridges 40 which are arranged symmetrically in the vertical direction and the transverse direction.

Further, as shown in FIG. 2, the total length D of each crash box 3 is set equal to or larger than a predetermined length so that each crash box 3 can absorb the impact energy sufficiently upon receipt of an impact load.

As shown in FIG. 3, the plate thickness Ct of the crash boxes 3, 3 is set smaller than the plate thickness Ft of the front side frames 1, 1 so that the crash boxes 3, 3 can be buckled and deformed upon receipt of an impact load from the front of the vehicle earlier than the front side frames 1, 1.

The base end part 3a of each crash box 3 is joined by fillet-welding W the entire periphery thereof to the front face of the corresponding set plate 4 firmly, as shown in FIG. 2.

An upper end wall 33 at the upper protrusion 35 of each crash box 3 substantially agrees with an upper wall 1a of the corresponding front side frame 1 when viewed from the front while a lower end wall 34 at the lower protrusion 36 of each crash box 3 substantially agrees with a lower wall 1b of the corresponding front side frame 1 when viewed from the front, as shown in FIG. 3.

The side walls 38a, 38b at the right protrusion 38 of each crash box 3 are intersected with a right wall 1d of the corresponding front side frame 1 when viewed from the front while the side walls 37a, 37b at the left protrusion 37 of each crash box 3 are intersected with a left wall 1c of the corresponding front side frame 1 when viewed from the front.

At the right wall 1d and the left wall 1c of each front side frame 1, the aforementioned reinforcing brackets 15, 15 are provided correspondingly to the right protrusion 38 and the left protrusion 37 of the corresponding crash box 3.

Specifically, as shown in FIG. 4, the reinforcing brackets 15, 15 extending in the longitudinal direction of the vehicle are provided at the front end parts of the left wall 1c and the right wall 1d of each front side frame 1 (only the left wall 1c is shown in FIG. 4), respectively.

Each reinforcing bracket 15 includes a plate joint flange 15a joined to the corresponding set plate 4, a frame joint flange 15b joined to the corresponding front side frame 1, and triangular joint beams 15c, 15c extending in the longitudinal direction of the vehicle to bridge between and connect the joint flanges 15a, 15b.

Provision of the reinforcing brackets 15, 15 allows an impact load transmitted from the right protrusions 38 and the left protrusions 37 (see FIG. 3) of the crash boxes 3, 3 to be transmitted from the set plates 4, 4 to the front side frames 1, 1 to achieve definite support.

Further, as shown in FIG. 3, each left protrusion 37 and each right protrusion 38 of the crash boxes 3, 3 are so set that the width Q2 of the distal part thereof is smaller than the width Q1 of the base part thereof.

This enlarges the space S around the periphery of each crash box 3 while on the other hand insertion of an impact trench (not shown) within the protrusions 35, 36, 37, 38 of each crash box 3 is facilitated in joining the crash boxes 3, 3 and the like to the front side frames 1, 1.

On the other hand, the width Q1 of each base part of the protrusions 37, 38 is set larger to increase the section modulus of the crash boxes 3, 3 thereby increasing the rigidity in the directions where the crash boxes 3 falls.

A plurality of notches 51, 52, 53 are formed in the front end part 3b of each crash box 3.

Specifically, as shown in FIG. 2 and FIG. 3, center notches 51, 51 extending in the vertical direction are formed in the central parts in the vertical direction of right and left end walls 38c, 37c of the right and left protrusions 37, 38. Further, upper notches 52 and lower notches 53 are formed in the side walls 35a, 35b of the upper protrusion 35 and the side walls 36a, 36b of the lower protrusion 36, respectively, so as to extend from the central parts in the vertical direction of the upper and lower protrusions 35, 36 to the base ends of the right protrusion 38 and the left protrusion 37 with the inwardly folded ridges 39 interposed.

These notches 51, 52, 53 serve as triggers for definitely causing buckling and deformation of the crash boxes 3, 3, as will be described later.

Though not shown specifically, parts of the front end parts 3b other than the notches 51, 52, 53 are welded and fixed to the bumper beam 2 by fillet welding.

Figure 5:
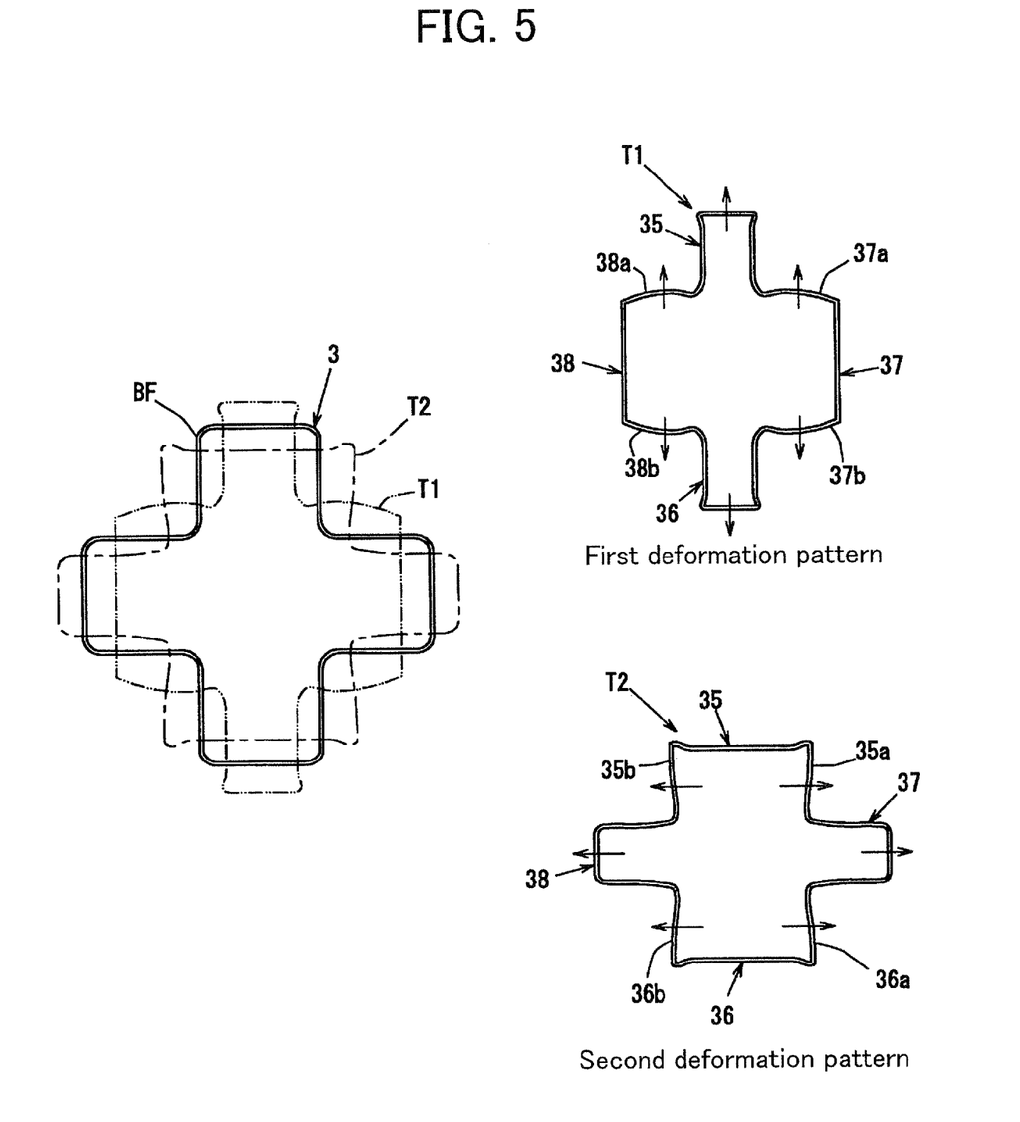
FIG. 5 is a schematic view for explaining a deformation state of the crash box in a substantially cross shape in closed section.
Figure 6:
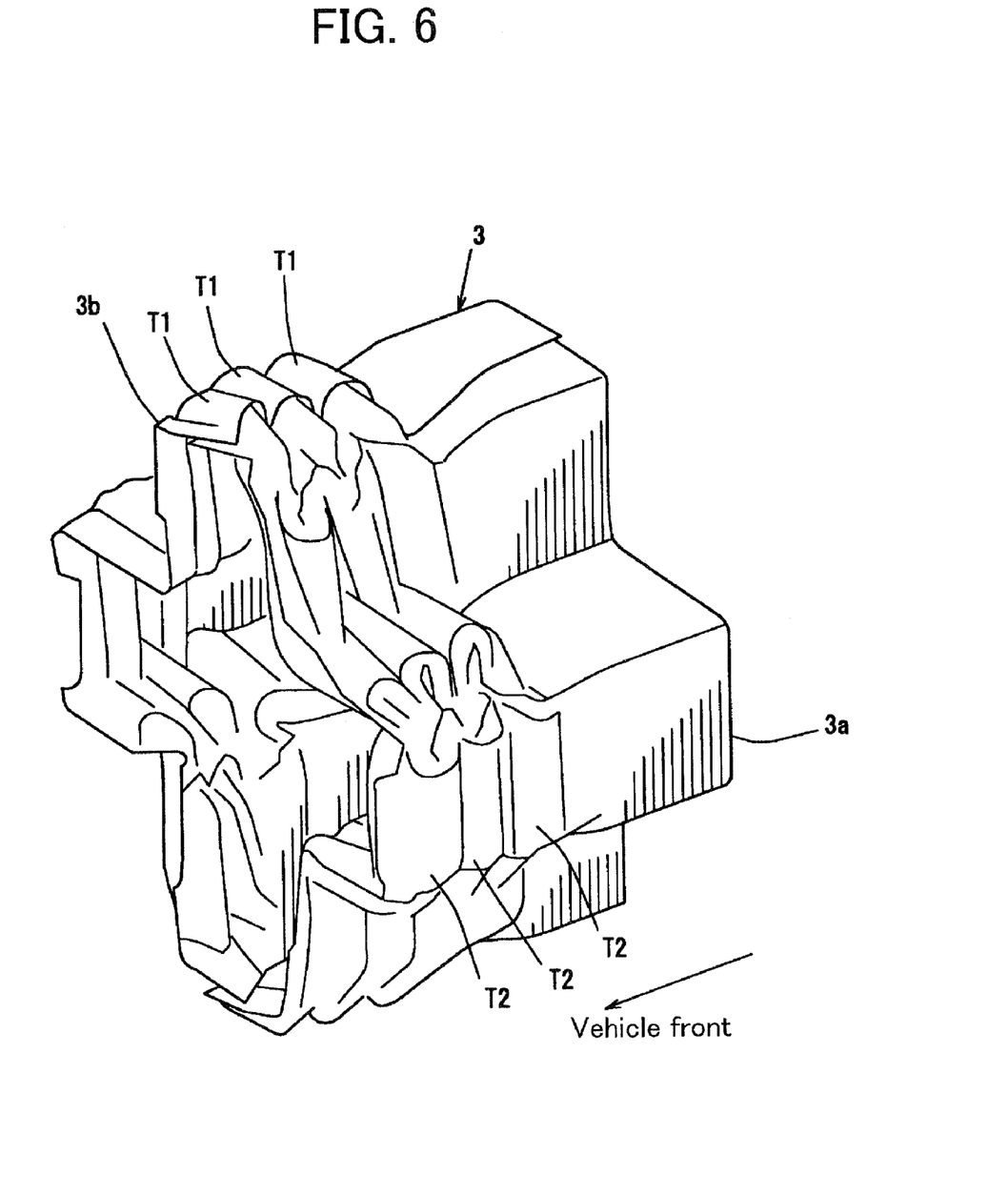
FIG. 6 is a perspective view showing the deformation state of the crash box.

Behavior that the crash boxes 3, 3 are deformed will be described next with reference to FIG. 5 to FIG. 8. FIG. 5 is a schematic view for explaining a deformation state of the substantially cross shape in closed section of one of the crash boxes, FIG. 6 is a perspective view showing the deformation state of the crash box, FIG. 7 presents plan views showing the difference in deformation of the crash box where a load input direction is different, and FIG. 8 is a load diagram showing the load-deformation amount curves of the crash box where the load input direction is different.

As shown in FIG. 5, upon receipt of an impact load, the crash box 3 alternatively causes two deformation patterns T1, T2 deformed from the square cross shape BF as the initial shape in section indicated on the left side to be buckled and deformed.

The two deformation patterns caused are a first deformation pattern T1 indicated at upper right and a second deformation pattern T2 indicated at lower right in FIG. 5.

In the first deformation pattern T1, the upper protrusion 35 and the lower protrusion 36 are deformed as if they are pulled upward and downward, respectively, while the upper and lower side walls 38a, 38b of the right protrusion 38 and the upper and lower side walls 37a, 37b of the left protrusion 37 are deformed as if they are also pulled upward and downward, respectively.

This is a deformation pattern caused by deformation of the wall faces in the direction along which the aforementioned notches 51, 52, 53 as the triggers are opened. Each crash box 3 is deformed in the longitudinal direction of the vehicle (the axial direction of the crash box 3) in this deformation pattern.

In contrast, in the second deformation pattern T2, the right protrusion 38 and the left protrusion 37 are deformed as if they are pulled leftward and rightward (transversely), respectively, while the side walls 35b, 35a of the upper protrusion 35 and the right and left side walls 36b, 36a of the lower protrusions 36 are deformed as if they are also pulled leftward and rightward, respectively.

This is a deformation pattern utilizing behavior that metal counterworks against buckling and deformation. The crash box 3 is deformed further in the longitudinal direction of the vehicle (the axial direction of the crash box 3) to be folded in this deformation pattern.

The alternate causing of the two deformation patterns T1, T2 makes the crash box 3 to be buckled and deformed definitely in the longitudinal direction of the vehicle.

Specifically, as shown in FIG. 6, the first deformation pattern T1 and the second deformation pattern T2 are caused alternately from the front end part 3b toward the rear end part 3a of the crash box 3 while buckling and deformation are repeated, so that the crash box 3 is compressed in the axial direction thereof to thus absorb the impact energy.

Buckling and deformation cause the two deformation patterns T1, T2 alternately, of which axes are not displaced therebetween, so that the crash box 3 can be buckled stably over a long range.

Further, in the present embodiment, the lengths of the sides of each protrusions 35, 36, 37, 38 are set almost equal to each other, as described previously, with a result that the deformation pitch (a length of the cycle of the first deformation pattern T1 and the second deformation pattern T2) is always the same to cause stable buckling and deformation.

Moreover, since the angle α at the corners 39, 40 between the sides are set substantially at a right angle, protruding deformation and withdrawing deformation are switched definitely at each corner (ridge) 39, 40 as a boundary to cause definite repetition of the deformation cycle of the first deformation pattern T1 and the second deformation pattern T2.

Figure 7A:
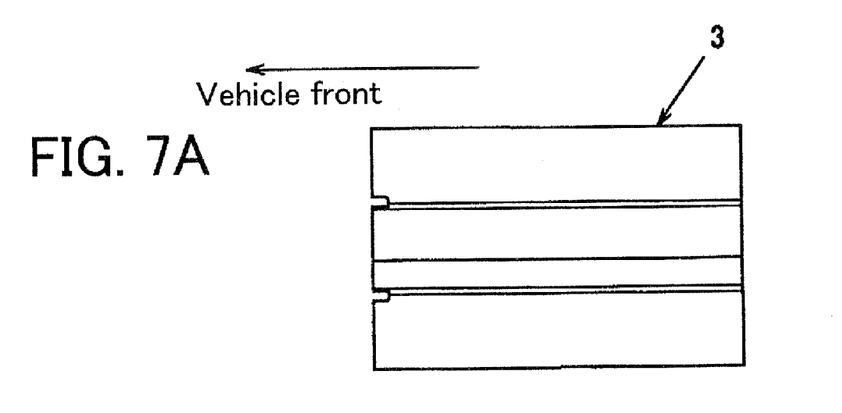
FIG. 7A is a plan view of the crash box before deformation.
Figure 7B:
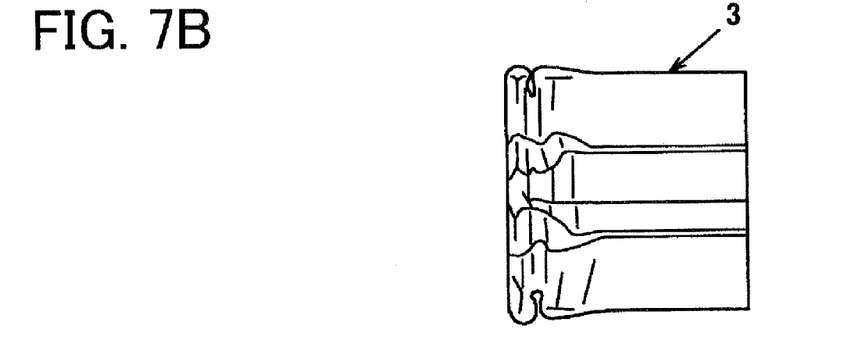
FIG. 7B is a plan view of the crash box deformed upon head-on collision.
Figure 7C:
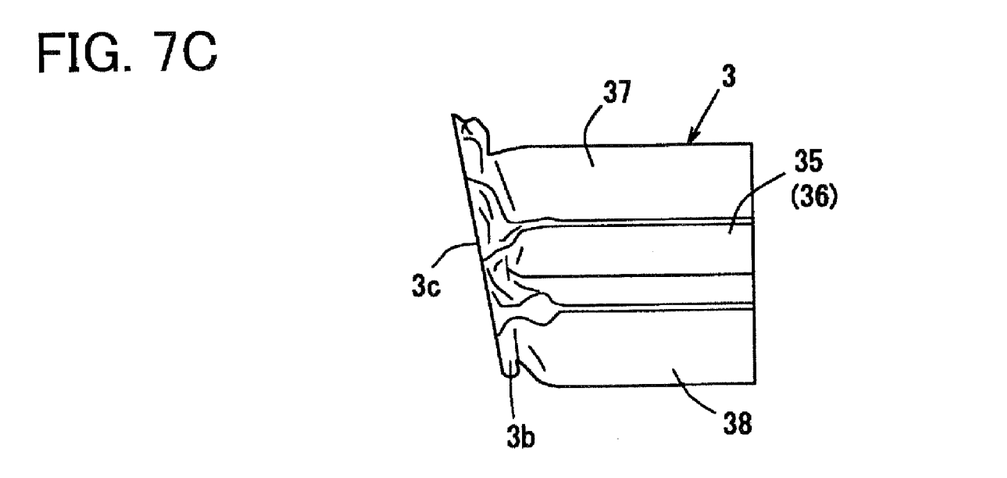
FIG. 7C is a plan view of the crash box deformed upon offset collision.
Figure 8:
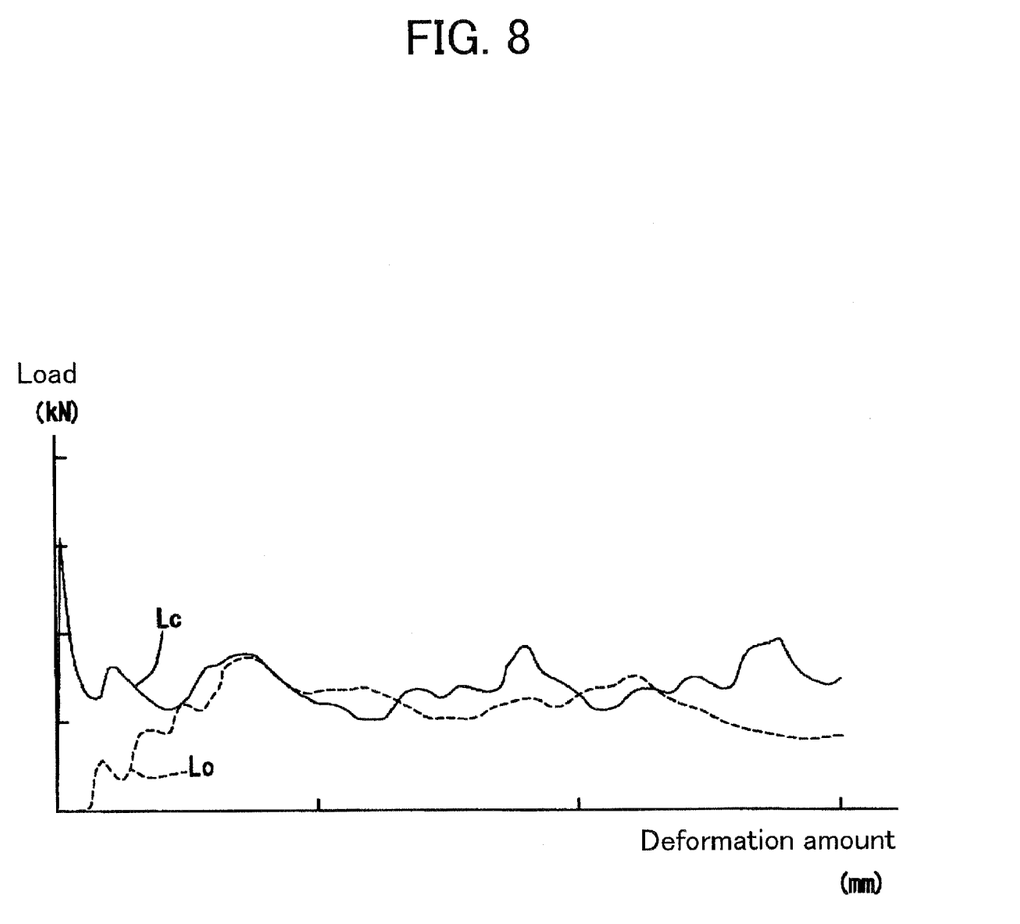
FIG. 8 is a load diagram showing the load-deformation amount curves of the crash box where the load input direction is different.

Referring to FIG. 7, difference in deformation of the crash box 3 will be described which is caused where a load input direction is different. FIG. 7A is a plan view of the crash box before deformation, FIG. 7B is a plan view showing a deformation state of the crash box upon head-on collision, and FIG. 7C is a plan view showing a deformation state of the crash box upon offset collision.

Buckling and deformation of the cross shape in closed section of the crash box 3 are repeated at head-on collision, as described previously, to cause compression of the crash box 3 in the longitudinal direction of the automobile (the axial direction of the crash box 3), as shown in FIG. 7B. Thus, the crash box 3 absorbs the impact energy at head-on collision of the vehicle.

In contrast, as shown in FIG. 7C, the crash box 3 is deformed with its front end face 3c slightly slanted sideways.

Nevertheless, no falling deformation is caused in the crash box 3 and only slight buckling and deformation is caused at the front end part 3b thereof because the crash box 3, which includes the right protrusion 38 and the left protrusion 37, has a large section modulus in the car width direction (the transverse direction) to have increased rigidity in the direction where it falls.

In other words, the cross shape in closed section of the crash box 3 exerts sufficient impact energy absorbing performance even at offset collision.

Accordingly, the crash boxes 3 of the present embodiment are buckled and deformed not only upon head-on collision but also upon offset collision. In other words, the crash box 3 absorbs the impact energy at any collision of the vehicle.

With the upper protrusion 35 and the lower protrusion 36 formed, the falling rigidity in the vertical direction of each crash box 3 is increased to prevent falling deformation of each crash box 3 even when an offset load in the vertical direction works thereon.

FIG. 8 shows a state where a load is generated upon deformation of the crash box 3. The solid line Lc indicates a load at head-on collision while the broken line Lo indicates a load at offset collision.

The load Lo at offset collision is lower than that Lc at head-on collision in the initial stage of the collision in which the deformation amount is small and is almost the same as that Lc at head-on collision in the middle to later stages in which the deformation amount increases.

This graph accordingly proves that the crash box 3 exhibits high impact energy absorbing performance not only at head-on collision but also at offset collision.

Figure 9A:
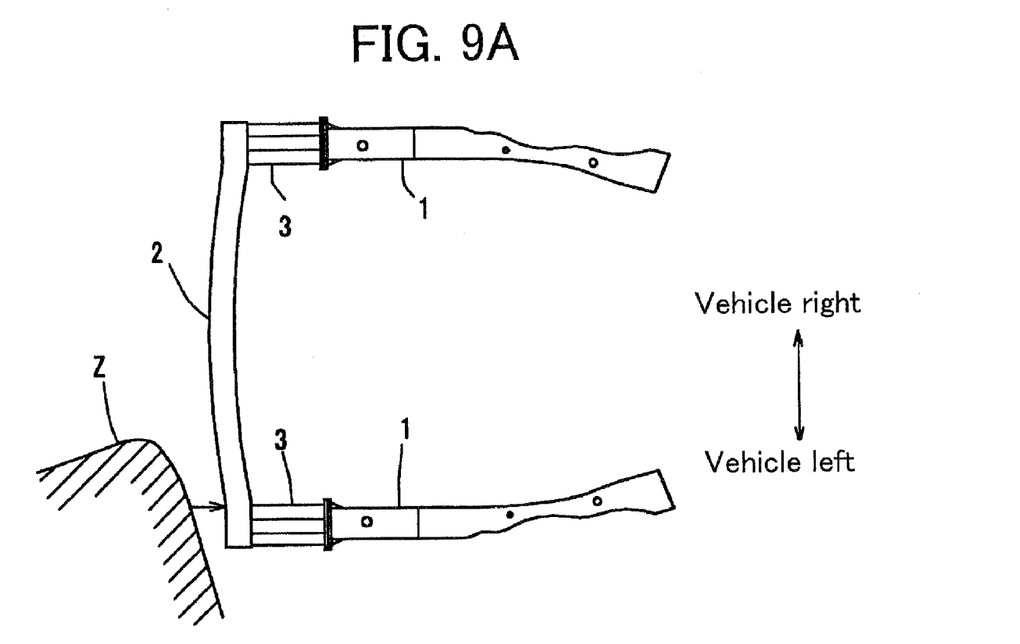
FIG. 9A is a plan view of the vehicle structure before deformation.
Figure 9B:
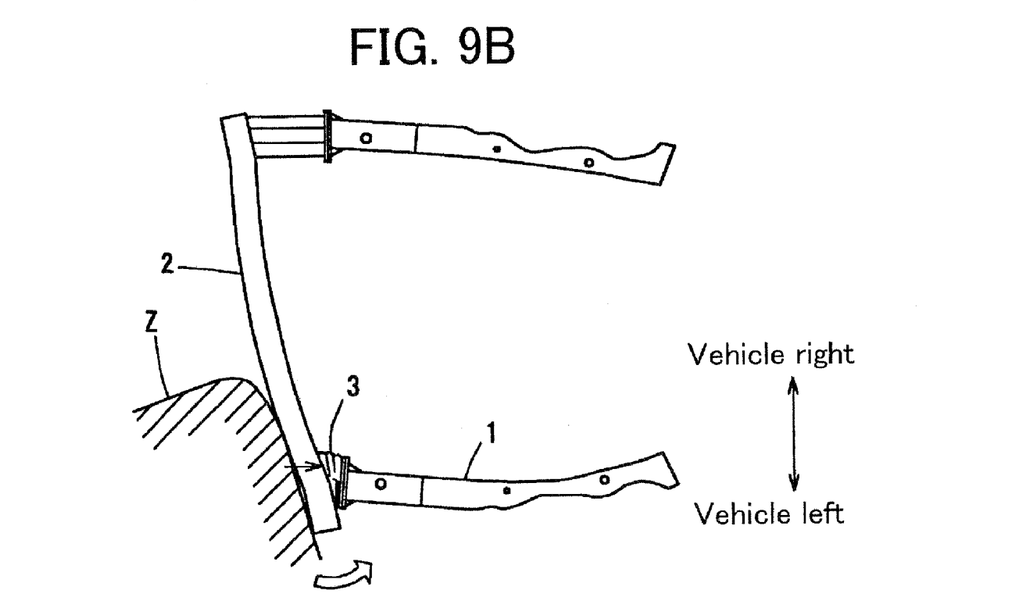
FIG. 9B is a plan view of the vehicle structure after deformation.

FIG. 9 shows a deformation state upon offset collision at the vehicle front end part in the vehicle structure, wherein FIG. 9A is a plan view before deformation, and FIG. 9B is a plan view after deformation.

As can be understood from the drawings, when a colliding object Z collides with the vehicle from the left front (see FIG. 9A), the left part in the car width direction of the bumper beam 2 at the front end of the vehicle is deformed to retreat large (see FIG. 9B).

At this time point, the left crash box 3 is buckled and deformed as described previously, so that the left front side frame 1 therebehind receives less or no impact energy to be less deformed.

Accordingly, with the vehicle structure of the present embodiment, the crash boxes 3 exhibit the impact energy absorbing performance even at offset collision to increase the vehicle performance against collision.

Effects obtained in the vehicle structure of the present embodiment will be described next.

The vehicle structure of the present embodiment includes: the bumper beam 2 extending in the car width direction; the crash boxes 3, 3 extending in the longitudinal direction of the vehicle and connected at the front ends thereof to the side end parts in the car width direction of the bumper beam 2; and the set plates 4, 4 to which the base end parts of the crash boxes 3, 3 are connected and which are mounted by means of the bolts B and the nuts N to the front ends of the front side frames 1, 1 extending in the longitudinal direction of the vehicle, wherein each crash box 3 has the substantially cross shape in closed section.

This arrangement increases the section modulus of the crash boxes 3, 3 not only in the vertical direction but also in the car width direction, thereby increasing the rigidity in the falling direction.

Thus, the crash boxes 3, 3 have increased rigidity both in the vertical direction and in the transverse direction, so as to be prevented from falling deformation even upon receipt of, for example, a load offset in the car width direction.

Hence, in the vehicle structure for an automobile in which the crash boxes 3, 3 are provided at the distal ends of the front side frames 1, 1 extending in the longitudinal direction of the vehicle, either crash box 3 can be bulked and deformed definitely upon receipt of not only a load from the front but also a load offset in the car width direction to exhibit the impact energy absorbing performance definitely.

In the present embodiment, the joint holes 41 through which the bolts B and the nuts N are inserted are formed at the four corners of each set plate 4 so that the respective protrusions 35, 36, 37, 38 of the cross shape in closed section of the corresponding crash box 3 are located between the joint holes 41.

This results in that the protrusions 35, 36, 37, 38 of the crash boxes 3, 3 in the cross shape in closed section are located near the bolts B and the nuts N to cause the impact load transmitted from the crash boxes 3, 3 to the set plates 4, 4 to be transmitted to the bolts B and the nuts N definitely.

Hence, the crash boxes 3, 3 can receive the impact energy effectively to thus enhance the impact energy absorbing performance of the crash boxes 3, 3.

The lengths L of the sides of the protrusions 35, 36, 37, 38 of the cross shape in closed section of the crash boxes 3, 3 are set almost equal to each other in the present embodiment.

This equalizes the collapse pitch, which varies depending on the lengths of the sides, in the entire periphery of the closed section, so that the crash boxes 3, 3 can be buckled and deformed in stable given modes.

Hence, the deformation modes can be caused constant regardless of the input angle of an impact load, thereby achieving stable impact energy absorbing performance of the crash boxes 3, 3.

In the present embodiment, the four protrusions 35, 36, 37, 38 of the cross shape in closed section of the each crash box 3 extend in the vertical direction and the transverse direction, and the upper end wall 33 of the upper protrusion 35 and the lower end wall 34 of the lower protrusion 36 substantially agree with the upper wall 1a and the lower wall 1b of the corresponding front side frame 1, respectively, when viewed from the front.

In this arrangement, the crash boxes 3, 3 in the substantially cross shape in closed section are overlapped at the upper protrusions 35 and the lower protrusion 36 thereof with the front side frames 1, 1 in the vertically long rectangular shape, so as to be intersected at the side walls 38a, 38b, 37a, 37b of the right protrusion 38 and the left protrusion 37 thereof with the front side frames 1, 1 when viewed from the front.

Accordingly, the base end parts 3a, 3a of the crash boxes 3, 3 are supported definitely by the front side frames 1, 1 at receipt of an impact load to cause the crash boxes 3, 3 to be buckled and deformed, thereby allowing the crash boxes 3, 3 to absorb the impact energy.

Hence, the crash boxes 3, 3 in the substantially cross shape in closed section can absorb the impact energy definitely at the distal ends of the front side frames 1, 1 in the vertically oblong rectangular shape in section.

Further, the reinforcing brackets 15, 15 are provided at the front end parts of each front side frame 1 so as to agree with the right protrusion 38 and the left protrusion 37 of the corresponding crash box 3 when viewed from the front.

Accordingly, the base end parts 3a, 3a of the crash boxes 3, 3 are entirely supported at receipt of an impact load to cause definite buckling and deformation of the entire peripheries of the crash boxes 3, 3, thereby allowing the crash boxes 3, 3 to absorb the impact energy.

Thus, the impact energy is absorbed at the entire peripheries of the crash boxes 3, 3 in the substantially cross shape in closed section.

Furthermore, in the present embodiment, each reinforcing bracket 15 is composed of the plate joint flange 15a, the frame joint flange 15b, and the triangular joint beams 15c, 15d connecting the joint flanges 15a, 15b.

Accordingly, the joint beams 15c, 15d exhibit the tensile force upon receipt of an impact load, which means that the reinforcing brackets 15, 15 additionally increases the rigidity for supporting the crash boxes 3, 3.

Each triangular joint beams 15c, 15d is narrow as it goes away from the front end part of the corresponding front side beam 1. Hence, the joint beams 15c, 15d will not hinder arranging, for example, the shroud panel or the like (not shown) aside the corresponding front side frame 1.

Thus, the rigidity for supporting the crash boxes 3, 3 is further increased with the use of the reinforcing brackets 15, 15 while the layout space aside each front side frame 1 can be secured.

Each reinforcing bracket 15 includes the triangular joint beams 15c, 15d in the present embodiment but is not limited to this shape. The reinforcing brackets 15, 15 may be brackets in an L shape in section. Alternatively, reinforcing plates or the like of which shape substantially agrees with the cross shape of the corresponding crash box 3 may be bonded to the reverse faces of the set plates 4, 4.

The width in section of the right protrusion 38 and the left protrusion 37 of each cash box 3 is set wider at the base parts (Q1) thereof than at the distal parts (Q2) thereof.

Accordingly, the work space for a bolt and nut fastening tool (not shown) for joining the bolts B and the nuts N between the protrusions 35, 36, 37, 38 can be secured sufficiently.

Furthermore, the sectional area at the base part (Q1) of each of the right and left protrusions 38, 37 is increased to increase the rigidity in the falling direction of the crash boxes 3, 3.

In sum, the operation for joining each crash box 3 can be facilitated, and the crash boxes 3, 3 can be prevented from falling deformation.

In addition, each crash box 3 is formed by overlaying the two bent members 31, 32 and spot-welding the overlap part 33a of the upper end wall 33 of the upper protrusion 35 and the overlap portion 34a of the lower end wall 34 of the lower protrusion 36.

Accordingly, the spot welding can be carried out in such a manner that a spot gun (not shown) is inserted into the inner space between the upper protrusion 35 and the lower protrusion 36, which is easy welding utilizing the longest space inside the cross shape in closed section.

Hence, the workability for welding the crash boxes 3, 3 can be increased.

Embodiment 2

Figure 10:
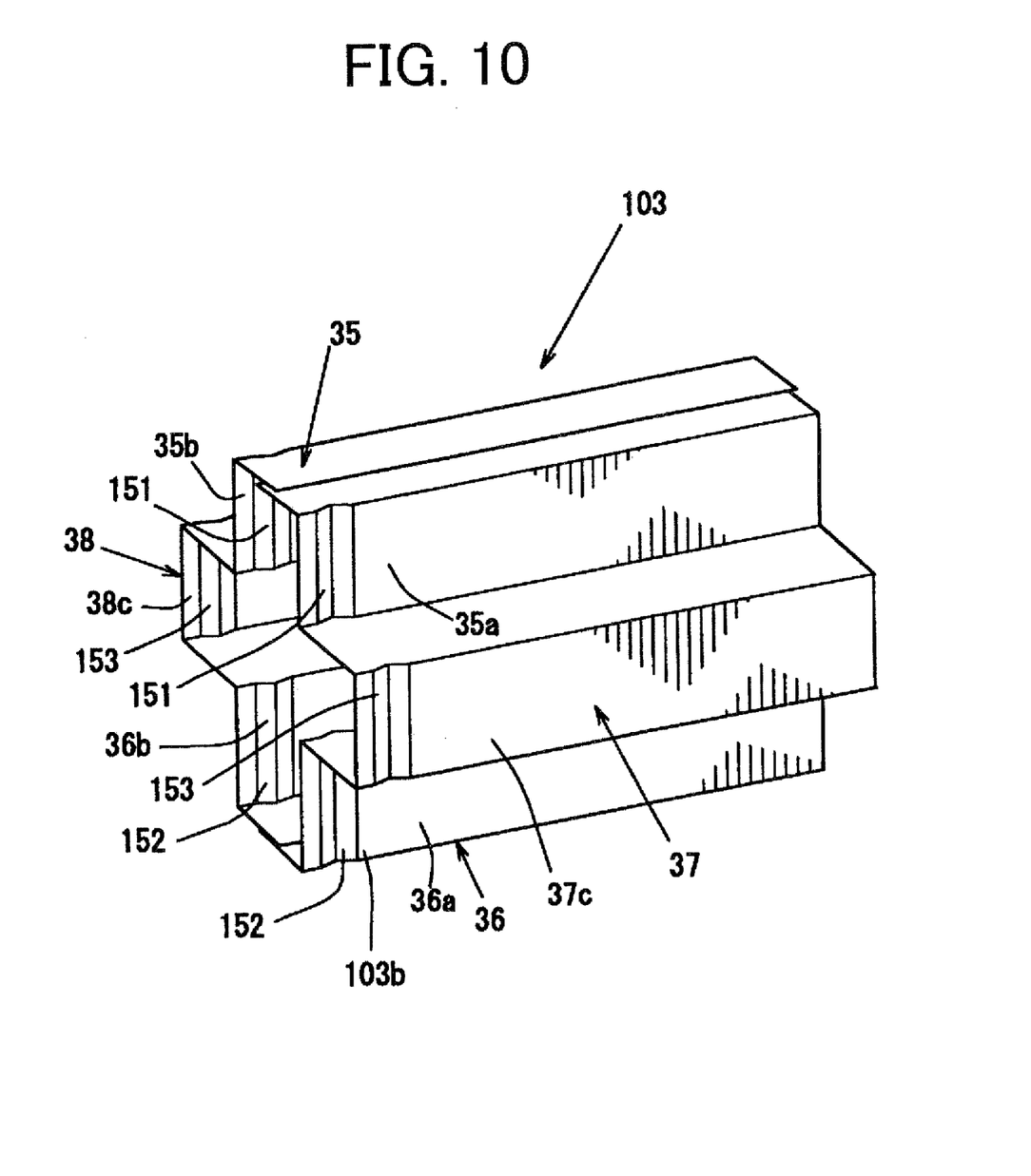
FIG. 10 is a perspective view of a crash box in accordance with Embodiment 2.

A crash box in accordance with Embodiment 2 will be described next with reference to FIG. 10. FIG. 10 is a perspective view of the crash box in accordance with Embodiment 2. The same reference numerals are assigned to the same components as in Embodiment 1 for omitting the description thereof.

A crash box 103 is different from the crash box 3 of Embodiment 1 in the shape of the trigger for causing buckling and deformation. Namely, inwardly folded beads 151, 152, 153 extending in the vertical direction are formed in the side walls at the front end part 103b of the crash box 103, rather than the notches 51, 52, 53.

Specifically, an upper inwardly folded bead 151 is formed in each of the side walls 35a, 35b of the upper protrusion 35, a lower inwardly folded bead 152 is formed in each of the side walls 36a, 36b of the lower protrusion 36, and a central inwardly folded bead 153 is formed in each of the right end wall 38c of the right protrusion 38 and the left end wall 37c of the left protrusion 37.

Formation of the inwardly folded beads 151, 152, 153 in the respective walls causes, upon receipt of an impact load, the aforementioned first deformation mode T1 from a front end part 103b of the crash box 103. Namely, the first deformation mode T1 is caused upon receipt of a compression load from the front of the vehicle in such a way that a part of the crash box 103 where the inwardly folded parts are not formed is deformed so as to be extruded outward by utilizing the counterwork against inward folding of the part thereof where the inwardly folded beads 151, 152, 153 are formed.

Accordingly, in the present embodiment, the first deformation mode T1 and the second deformation mode T2 are caused alternately and repeatedly to thus buckle and deform the crash box 103.

The inwardly folded beads 151, 152, 153 serving as triggers for causing buckling and deformation restrict the direction of deformation well when compared with the case with the notches, thereby further enhancing the reliability in buckling and deformation.

Further, the entire periphery at the distal end of the crash box 103 can be joined to the bumper beam 2 by fillet-welding irrespective of the shape of the distal end thereof. Hence, the workability for welding can be enhanced.

In sum, buckling and deformation can be caused more definitely, and the workability for welding can be enhanced in the present embodiment.

Embodiment 3

Figure 11:
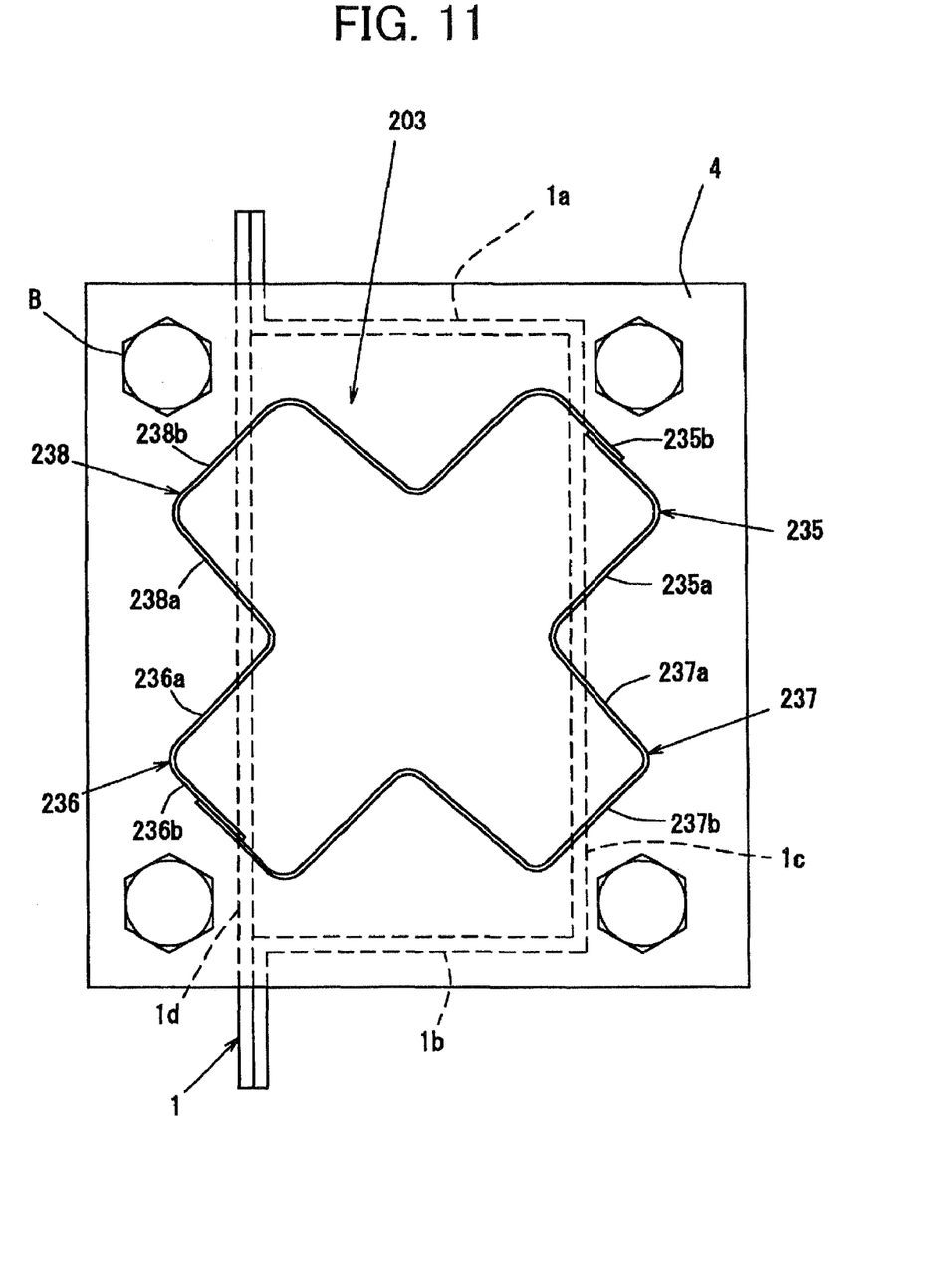
FIG. 11 is a front view showing the positional relationship between the crash box and the front side frame.

A crash box in accordance with Embodiment 3 will be described next with reference to FIG. 11. FIG. 11 is a front view showing the positional relationship between the crash box and the front side frame. The same reference numerals are assigned to the same components as in Embodiment 1 for omitting the description thereof.

A crash box 203 of the present embodiment, which is in the substantially cross shape in closed section, is so arranged that protrusions 235, 236, 237, 238 are inclined at approximately 45 degrees with respect to the vertical direction to form a substantially X shape.

With this arrangement of the crash box 203, the positional relationship thereof with the front side frame 1 becomes different from that in Embodiment 1. Namely, the protrusions 235, 236, 237, 238 of the crash box 203 are intersected with the right and left side walls 1d, 1c of the side frame 1 when viewed from the front. More specifically, side walls 235a, 236a, 237a, 238a in the central part in the vertical direction of the crash box 3 and peripheral walls 235b, 236b, 237b, 238b of the protrusions 235, 236, 237, 238 are intersected with the side walls 1c, 1d of the front side frame 1 when viewed from the front.

With this arrangement of the crash box 203, in the present embodiment, the crash box 203 can be caught by the front side frame 1 definitely upon receipt of an impact load.

Specifically, since the crash box 203 is arranged to form the substantially X shape against the front side frame 1 in the transversely oblong rectangular shape, all the four protrusions 235, 236, 237, 238 can be caught by the front side frame 1 definitely regardless of each position of the upper wall 1a and the lower wall 1b of the front side frame 1.

Accordingly, the crash box 203 can be reduced in size when compared with the crash box 3 in Embodiment 1, thereby leading to reduction in weight of the crash box 203.

The same buckling and deformation of the crash box 203 as those in Embodiment 1 are caused definitely upon receipt of an impact load regardless of whether it is head-on collision or offset collision, and accordingly, high impact energy absorbing performance can be attained.

As described above, in the present embodiment, the four protrusions 235, 236, 237, 238 of the crash box 203 in the cross shape in closed section are arranged so as to extend in diagonally so that the central parts in the vertical direction of the side wall 235a, 236a, 237a, 238a of the protrusions 235, 236, 237, 238 are intersected with the side walls 1c, 1d of the front side frame 1 when viewed from the front.

Accordingly, upon receipt of an impact load, the base end part of the crash box 203 is supported by the front side frame 1 definitely to allow the cash box 203 to be buckled and deformed definitely, thereby allowing the crash box 203 to absorb the impact energy.

Thus, the crash box 203 in the substantially X shape in closed section can absorb the impact energy definitely at the distal end of the front side frame 1 in the vertically oblong rectangular shape.

Particularly, even a crash box 203 small in size can transmit an impact load to the front side frame 1 definitely, thereby contemplating reduction in weight of the crash box 203. This leads to reduction in weight of the vehicle as a whole.

The present invention corresponds to the above embodiments in that: the mounting plate corresponds to each set plate 4; the vehicle frame corresponds to each front side frame 1; the fasteners correspond to pairs of the bolts B and the nuts N; the protrusions correspond to the protrusions 35, 36, 37, 38, 235, 236, 237, 238; and the reinforcing member corresponds to each reinforcing bracket 15. The present invention is, however, not limited to the above embodiments and includes embodiments applicable to any vehicle structures of various automobiles.

The crash boxes 3, 3 are mounted to the front ends of the front side frames 1, 1 in the above embodiments but may be mounted at the rear of the front side frames 1, 1.

The crash boxes are welded and fixed to the bumper beam in the above embodiments but may be fixed thereto in such a manner that another set plate is provided at the front end of each crash box for fastening and fixing the crash boxes to the bumper beam.

What is claimed is:

1. A vehicle structure for an automobile having a front-side frame extending in a longitudinal direction, the frame including side walls, an upper wall and a lower wall forming a substantially closed cross section, the vehicle structure comprising:
a crash box including at least a first protrusion having an end wall and side walls, a second protrusion having an end wall and side walls, a third protrusion having an end wall and side walls, and a fourth protrusion having an end wall and side walls, as viewed from a front end of the automobile,
wherein the at least side walls of the third protrusion and of the fourth protrusion cross the side walls of the front-side frame, respectively, as viewed from the front of the automobile;
wherein each of the first protrusion, second protrusion, third protrusion and fourth protrusion includes a base part, and the base part is located inside the closed cross section of the front-side frame, as viewed from the front of the automobile;
a bumper beam extending in a car width direction; and
a mounting plate having a face to which a base end of the crash box is connected and another face mounted to a distal end of a vehicle frame extending in the longitudinal direction of the automobile by means of fasteners,
wherein the crash box with the protrusions is in a substantially cross shape in closed section, and
the crash box extends in a longitudinal direction of the automobile and is connected at a distal end thereof to a side part in the car width direction of the bumper beam.

2. The vehicle structure of claim 1, wherein
joint holes, through which the fasteners are inserted, are formed at four corners of the mounting plate, the joint holes of the mounting plate are positioned outside of the closed cross section of the vehicle frame, as viewed from the front of the automobile, and
the protrusions of the crash box in the substantially cross shape in closed section are arranged between the joint holes.

3. The vehicle structure of claim 1, wherein
the length of each of the end wall and side walls of the first protrusion, the length of each of the end wall and side walls of the second protrusion, the length of each of the end wall and side walls of the third protrusion, and the length of each of the end wall and side walls of the fourth protrusion of the crash box are substantially equal in length to each other.

4. The vehicle structure of claim 1, wherein the end wall of the first protrusion is configured to substantially align with the upper wall of the front-side frame, the end wall of the second protrusion is configured to substantially align with the lower wall of the front-side frame, as viewed from the front of the automobile.

5. The vehicle structure of claim 1, wherein
the closed cross section vehicle frame is in a vertically oblong rectangular shape, and
the protrusions of the crash box in the substantially cross shape in closed section are inclined with respect to a vertical direction of the automobile so that the side walls of the protrusions are intersected at central parts in the vertical direction of the crash box with side walls of the vehicle frame when viewed from front.

6. The vehicle structure of claim 2, wherein
at least one of the protrusions of the crash box in the substantially cross shape in closed section has a width which is wider at the base part thereof than at a distal part thereof.

7. The vehicle structure of claim 1, wherein
the crash box is formed by overlaying a plurality of members and spot-welding wall faces thereof overlapped with each other, the wall faces being peripheral walls of protrusions of the substantially cross shape in closed section.

8. The vehicle structure of claim 4, wherein
a reinforcing member extending in the transverse direction of the automobile is provided to the vehicle frame so as to interface with one of protrusions of the crash box which extends in the transverse direction thereof when viewed from the front of the automobile.

9. The vehicle structure of claim 8, wherein
the reinforcing member includes:
a frame mounting face mounted to a side face of the vehicle frame;
a plate mounting face mounted to the other side face of the mounting plate; and
a beam part extending in the longitudinal direction of the automobile between the frame mounting face and the plate mounting frame, the beam part being narrow in the car width direction by tapering away from a front-facing distal end of the vehicle frame.

10. The vehicle structure of claim 1, at least one inwardly folded bead disposed at a front end of each of the protrusions to facilitate a predetermined deformation of the crash box during a frontal collision.

11. The vehicle structure of claim 10, wherein one inwardly folded bead is provided on each of the side walls of the first protrusion, the side walls of the second protrusion, the end wall of the third protrusion, and the end wall of the fourth protrusion.

* * * * *